Nov. 18, 1969     H. HECHENLEITNER     3,478,485
PROCESS AND WELDING DEVICE FOR MAKING
CONTAINERS FILLED WITH FLUID
Filed Aug 2, 1967     2 Sheets-Sheet 1

INVENTOR.
Hans Hechenleitner
BY Ernest Montague
attorney

United States Patent Office 3,478,485
Patented Nov. 18, 1969

3,478,485
PROCESS AND WELDING DEVICE FOR MAKING CONTAINERS FILLED WITH FLUID
Hans Hechenleitner, Villach, Austria, assignor to Hechenleitner & Cie., Villach, Austria, a corporation of Austria
Filed Aug. 2, 1967, Ser. No. 657,829
Claims priority, application Austria, Oct. 14, 1966, A 9,634/66
Int. Cl. B65b 9/06, 9/12
U.S. Cl. 53—28      3 Claims

ABSTRACT OF THE DISCLOSURE

A process and apparatus for making containers filled with liquid having longitudinal end flaps from longitudinal strips of plastic material, coated paper, and the like, comprising bending a strip longitudinally along its length and welding the adjacent inner surfaces adjacent the longitudinal edges of the strip together to form a longitudinal welding seam with extending edges and welding transversely a lower end thereof to form a tube capable of being filled with liquid with a substantially lenticular cross-section, filling the tube with fluid, compressing the substantially lenticular cross-section of the tube with two die halves one of which is pivotally mounted for horizontal pivotal movement forming an acute angle with the other die half into a wedge-shaped cross-sectional tube in which the narrow end of the wedge is at the longitudinal welding seam, shaping sections of the tube into a container section thereby causing the tube to extend at the bent longitudinal portion due to the counter pressure caused by the fluid within the tube which is pressed back during the shaping, and transversely welding the tube at the end of the shaped section to form a completely fluid filled container, which transverse welding is accomplished thereby without small longitudinal folds.

---

Figure 1:
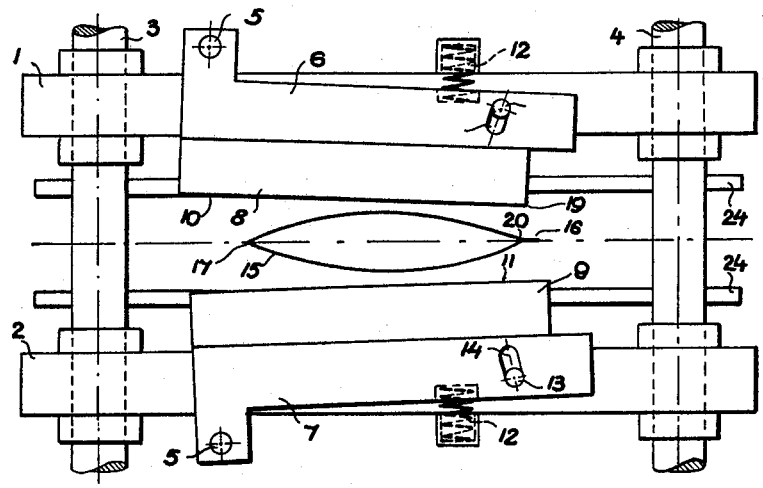

The present invention relates to a process for making square containers filled with fluid, the containers having end flaps which are derived from a vertically advanced tube filled with the fluid, whereby the tube consists of a folded strip of plastic material, coated paper, or the like, which is provided with a welding seam at the side, formed by welding together the inner surfaces of the edges of the strip and which is formed into sections, shaped into containers, and welded transversely after its lower end has been welded transversely.

In spite of being filled with the fluid, the tube which is to be welded, has small longitudinal folds which cause difficulties when welding together the tube. With those welding devices already known, characterized by dies which are moved parallel towards each other, these folds are not removed before the welding process because the filling material which is pressed back into the tube by the dies hardly extends the tube in the lengthwise direction of its cross-section on account of the approximately lenticular shape of the cross-section. The folds are therefore pushed together and reversed to the outer surfaces or to the inner surfaces of the tubular strip which is to be welded. However, welding will be defective at the reversing edges of the folds and the welding seam will not be liquid-tight.

It is an object of the present invention to provide a process which makes it possible to provide containers as described above with perfectly tight transverse welding seams, wherein the approximately lenticular cross-section of the tube is changed into a wedge-shaped cross-section in the direction of the welding seam at the side within the range of the dies for transverse welding, and the walls of the tube are extended on account of the pressure which develops from the filling material which is pressed back during the formation of the square container, possibly by shifting the welding seam at the side away from the tube, and the tube is welded transversely.

Changing the shape of the cross-section of the tube according to the process of the present invention and, consequently, the reduction of the cross-sectional area causes the filling material which flows back from the lower tube section into the tube during the formation of the container with end flaps to exert a greater pressure on the walls of the tube on account of the reduced volume. According to the principle of flow this hydrostatic pressure becomes effective in the direction of the folding edge which is located opposite the welding seam at the side, whereby the folds are smoothed.

It is another object of the present invention to provide welding devices to carry out this process wherein the dies are located on supports which can be moved horizontally towards each other, and one end of at least one of the two dies is pivotally attached to the support so that it can be turned about an axis in the horizonatal direction, which is located on the support, and the other end of the die is provided with a spring to keep it at an acute angle from the other die during its opened position.

As soon as the die, which is at first in an inclined position, comes into contact with the opposite die, the approximately lenticular cross-section of the tube within the range of the welding surfaces of the dies is changed into a wedge-shaped cross-section in the direction of the welding seam at the side. During the following closing movement of the dies this cross-section of the tube is even further reduced. Together with the reduction of the cross-section, i.e., before the dies are fully pressed against the tube for the purpose of welding, the tube section within the range of the dies is shaped to a square container. A shaping device carries out this shaping process, consisting of two stable plates and—between them—lateral and lower dies, which are moved towards the tube section, whereby these shaping dies, when in their final position, press the shaped container which is still connected with the tube against the welding dies. The movement of these lateral and lower dies is regulated in such a manner that the lower shaping dies are brought into their final position shortly before the lateral shaping dies reach their final position. While shaping the container, filling material from the tube section between the welding seam is pressed back into the tube on account of the wedgeshaped cross-section, and the walls of the tube are extended so that there are no folds when the tube rests between the welding dies, and therefore it can be welded transversely as soon as the lateral shaping dies have reached their final position. The shaping of the container can also be carried out with other devices, e.g., a shapping device which is provided with two solid shaping dies.

A further embodiment of the welding device according to the invention is characterized in that according to the invention the edge of the free end of the inclined die which faces the tube and runs parallel to it rests in a plane which is parallel to that of the closing movement, which crosses the inner edge of the welding seam at the side, and the perpendicular distance of the axis from the welding surface of the die approximately equals half the length of the die. Due to this advantageous arrangement that part of the tube which is close to the welding seam at the side and which mainly shows folds is extended transversely for their removal. During the closing movement of the dies the inclined die is resisted by the opposite die as soon as that edge which runs parallel to the tube rests on the inner edge of the welding seam at the side, and is turned about its axis in the further course of the closing movement. Consequently, the edge of the die is pushed away from the tube along the longitudinal central plane of the cross-section of the tube, thereby taking along the welding seam of the tube so that that part of the tube which is close to the welding seam at the side is extended and its folds are removed. To remove the folds a comparatively small shift of the edge, approximately 3 to 5 mm., is sufficient. It is obtained by arranging the axis of rotation of the inclined die at a perpendicular distance from the welding surface which corresponds to about half the length of the die.

By shifting the welding seam at the side it is moved into an upright position and forms an angle of approximately 90 degrees with the longitudinal central plane of the cross-section of the tube. This is an important precondition for the shaping of the tube section which is below the welding dies, since it is not possible to produce a square container without reversing the welding seam.

The apparatus according to the invention is provided with conventional controls for the welding dies and for the shaping dies of the shaping device, which depend on each other, with e.g. a hydraulic device whose valves are moved by a cam plate.

Some embodiments of the welding device according to the invention are provided with two welding dies which rest pivotally on supports causing the dies to form an acute angle.

Figure 3:
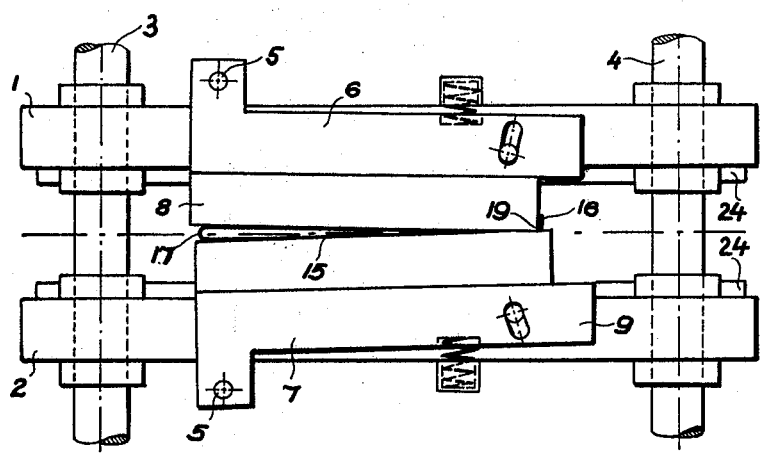
Figure 4:
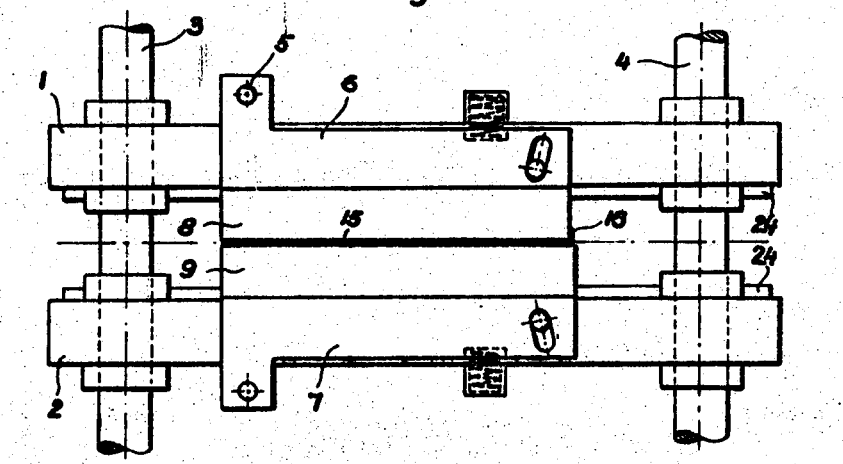
Figures 5, 6:
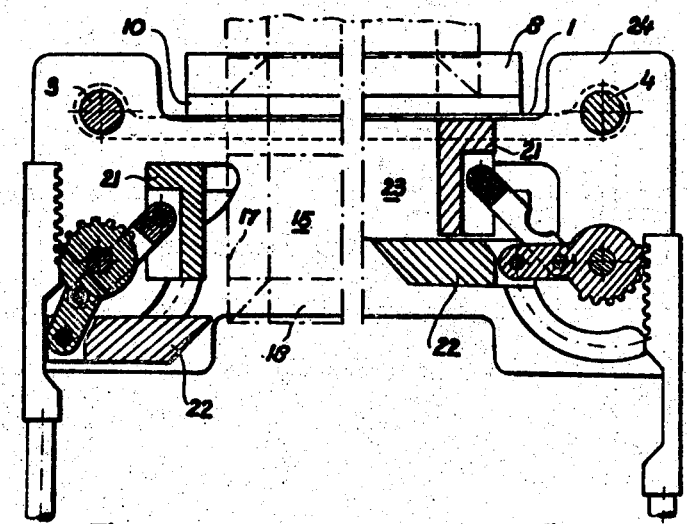

With these and other objects in view which will become apparent in the following detailed description, the present invention will be clearly understood in connection with the accompanying drawings, in which:

FIGURES 1 to 4 show top views of positions of the welding device with the tube therein; and FIGS. 5 and 6 are schematic longitudinal sections of two positions of the shaping device which collaborates with the welding device.

According to FIGURES 1 to 4 the welding device is provided with two supports 1, 2 which are movable towards each other in parallel direction by means of two horizontally arranged columns 3, 4 and by means of a drive which is not shown in the drawings. The supports are provided with angular rails 6, 7 which are movable about axes 5 in a horizontal direction and which support the welding dies 8, 9. The perpendicular distance between the welding surfaces and the axes which are attached to the supports approximately equals half the length of the welding dies and their welding surfaces 10, 11. On account of springs 12 which are provided close to the free ends of the rails, and which rest on the supports, the rails are put into such an inclined position that the welding dies form an acute angle. Pins 13 are located on the supports and pass through slots 14 provided in the rails to keep the rails in those positions which the welding dies take in their original and in their opened positions (FIG. 1). Tube 15 hangs between the welding dies and, according to FIG. 5, its lower end extends into the shaping device which is located below the welding device. The tube with the filling material shows almost a lenticular cross-section; on one side it is provided with a welding seam 16 which was formed before the tube reached the welding device by welding together the adjoining inner surfaces of the edges of the folded strip, with the folding edge 17 at the other side. The lower end of the tube is closed by a transverse welding seam 18.

Figure 2:
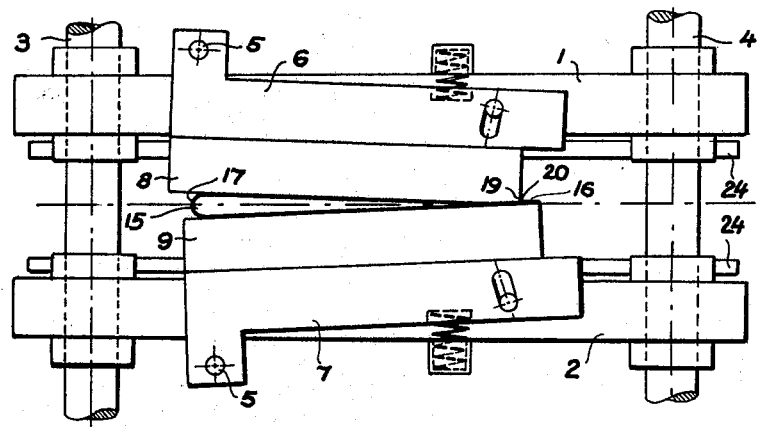

During the closing movement of the dies the inclined dies change the lenticular cross-section of the tube into a wedge-shaped cross-section in the direction of the welding seam 16 (FIGURES 2 and 3). As the welding dies come into contact with each other, the tube being inserted between them, edge 19 of die 8 which rests on the tube and runs parallel to it touches the inner edge 20 of the welding seam 16 of the tube. The length of die 9 is of such proportions that it exceeds this edge 19. This effect can also be brought about, when the dies are of equal length, by a corresponding change in the position of the axis of the die 9 in relation to the axis of die 8. During the further closing movement of the two dies, which support each other, they are turned about their axes 5 against the action of their springs 12 (FIGURE 3). On account of this, the cross-section of the tube is reduced, while the edge of die 19 which moves away from the tube removes welding seam 16 into the same direction, whereby welding seam 16 is reversed. Thus all preconditions are fulfilled which enable the welding of the tube without folds and the formation of a square container out of the tube section which hangs into the shaping device.

While the cross-section of the tube is reduced the two movable lateral and lower shaping dies 21, 22 which are located between two stable plates 24 (FIGURES 1 to 6) and which are shown in FIGURE 5 in their original position, are moved into their final position. This is done such that the lower dies are moved into their final position as indicated by FIGURE 6 shortly before the lateral dies reach their final position by means of a driving motor which is not shown in the drawings and which is so co-ordinated with the working speed of the welding device. During the shaping process the filling material is pressed through the tube section which is located between the dies, causing the tube to be extended in the direction of the folding edge 17, whereby the welding seam 16 is secured in its position by the dies. After the square container 23 has been formed the welding dies are brought into their final position, where they are located parallel to each other and press together the walls of the tube which show no folds for the purpose of transverse welding (FIGURE 4).

While I have disclosed several embodiments of the present invention, it is to be understood that these embodiments are given by example only and not in a limiting sense.

I claim:

1. A process for making containers filled with liquid and with longitudinal end flaps from longitudinal strips of plastic material, coated paper, or the like, comprising the steps of
   bending a strip longitudinally along its length to form overlapping lateral longitudinal edges,
   welding the adjacent inner surfaces adjacent said overlapping lateral longitudinal edges of the strip together to form a lateral welding seam and to form a tube having a substantially lenticular cross-section,
   welding transversely one end of said tube successively to form square shaped containers,
   filling said tube with liquid,
   deforming prior to said transverse welding said substantially lenticular cross-section of said tube within a predetermined range,
   deforming the cross-section of said tube in a direction toward said lateral welding seam, and
   stretching the walls of said tube both by pressure created by said liquid providing a return pressure in said tube during said formation of said square shaped containers and also by displacing said longitudinal welding seam in a direction away from said tube.

2. A welding apparatus for transversely welding a vertically extending tube having a longitudinal welding seam and filled with liquid to make therefrom containers filled with liquid, comrising
   welding die means including two die halves mounted on horizontal supports for moving said die halves horizontally towards each other,
   one end of at least one of said two die halves is pivotally attached to one of said supports for horizontal pivotal movement about an axis located on said one of said supports, and
   the other end of said at least one of said two die halves is spring mounted on said one of said supports for maintaining said at least one of said two die halves at an acute angle relative to the other of said two die halves during an open position of said welding die means.

3. The apparatus, as set forth in claim 2, wherein
the edge of said other end of at least one of said two die halves which faces said vertically extending tube and runs parallel to it rests in a plane which is parallel to that of the closing movement of said two die halves and which crosses the inner edge of the welding seam, and the perpendicular distance of said axis from a welding surface of said at least one of said two die halves approximately equals half the length of said at least one of said two die halves.

References Cited
UNITED STATES PATENTS 2,385,897  10/1945  Waters  ----------- 53—180 X
3,335,540  8/1967  Reil et al. ----------- 53—28

THERON E. CONDON, Primary Examiner

E. F. DESMOND, Assistant Examiner

U.S. Cl. X.R.

53—373; 156—583